Dec. 7, 1926.                                                  1,609,571
R. E. OLSON
HUMIDITY CALCULATOR
Filed Feb. 2, 1925
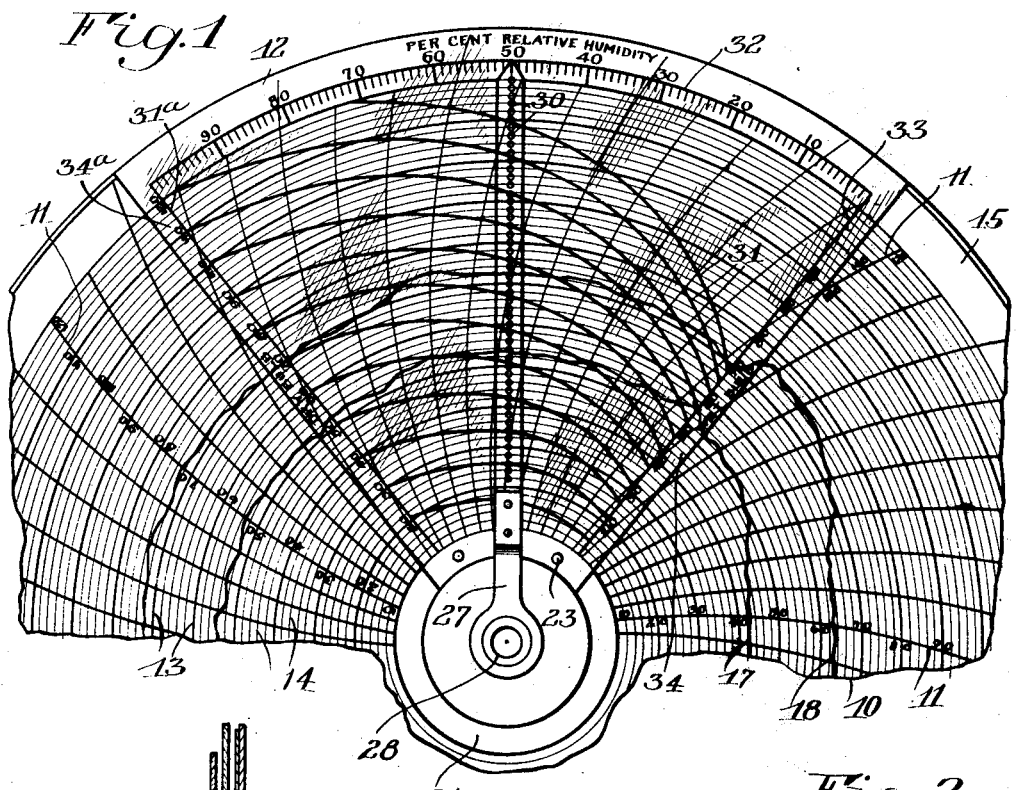
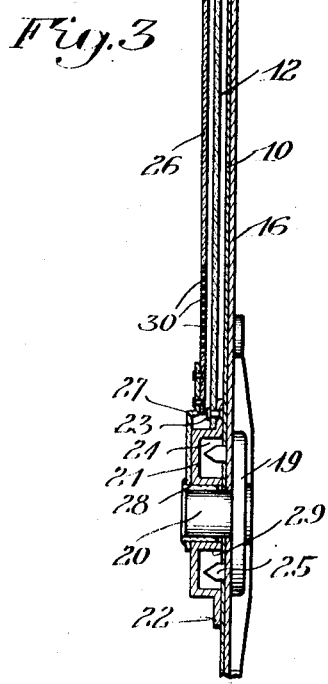
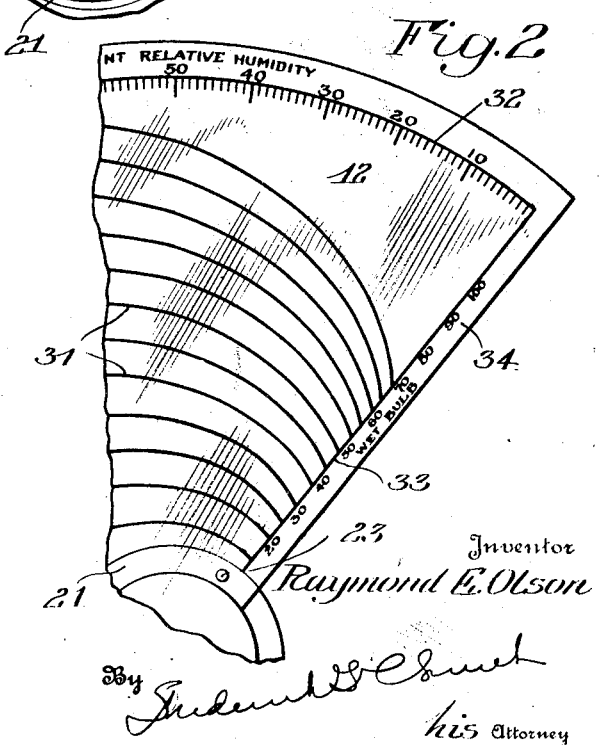
Inventor
Raymond E. Olson
By Frederick G. Church
his Attorney Patented Dec. 7, 1926.

1,609,571

UNITED STATES PATENT OFFICE.

RAYMOND E. OLSON, OF ROCHESTER, NEW YORK, ASSIGNOR TO TAYLOR INSTRUMENT COMPANIES, OF ROCHESTER, NEW YORK, A CORPORATION OF NEW YORK.

HUMIDITY CALCULATOR.

Application filed February 2, 1925. Serial No. 6,328.

The present invention relates to humidity indicating means for use with wet and dry bulb thermometer charts and has for its object to provide improved means by which the percent relative humidity may be quickly and readily determined from the records made by the wet and dry bulb recording thermometers for any desired time period covered thereby.

Another object of the invention is to provide in combination with a wet and dry bulb recording thermometer chart a second chart movable relative thereto together with means adapted to cooperate therewith for determining the relative humidity from the wet and dry bulb thermometer curves for any desired time covered by the recording thermometers.

To these and other ends the invention resides in certain improvements and combinations of parts, all as will be hereinafter more fully described, the novel features being pointed out in the claims at the end of the specification.

In the drawings:—

Figure 1 is a fragmentary view and elevation showing the application of the invention to a wet and dry bulb thermometer chart;

Figure 2 is a fragmentary elevational view of the revoluble sector shown in Figure 1 from which the percent relative humidity readings are taken, and Figure 3 is a sectional elevation of the parts shown in Figure 1 taken on a line centrally of the pointer shown therein.

Similar reference numerals throughout the several views indicate the same parts.

The present invention embodies a chart or diagram movable relative to a wet and dry bulb recording thermometer chart and constructed preferably of transparent material whereby the data on said thermometer chart may be viewed through the first mentioned chart so that by the use of an indicating member the operator may determine from the data on said charts the relative humidity at any desired time covered by the recording thermometers.

In the drawings I have shown a wet and dry bulb thermometer chart 10 of a well known type which may be designed to cover any desired period of time and which, by way of example, is shown as a 7 day chart with periods of twenty-four hours indicated between the radial lines 11, certain of which are omitted beneath the transparent sector 12 for the sake of clearness. These time periods are shown sub-divided into eight three-hour periods, each of which may be further sub-divided into one hour periods if desired.

The temperature spacings are shown divided by the heavy concentrically arranged lines 13 into divisions of 10 degrees which are further sub-divided into spacings of two degrees by the relatively light lines 14.

Any suitable data not shown may be printed or otherwise disposed upon the border space 15 of the chart for indicating the time periods, such as the different days of the week, the hours of each and any other data desired.

The chart is carried by a revoluble disk 16 adapted to be driven in a well known manner, as by a clock mechanism not shown. Any suitable type of wet and dry bulb recording thermometers, not shown, may be employed in connection with the chart for recording the temperatures indicated respectively by the irregular curves or lines 17 and 18 of the chart.

The disk 16 is provided with a centrally disposed reinforcing member 19 having a hub or sleeve 20 projecting through the disk for receiving a driving spindle, not shown, and which also forms a support about the axis of which is rotatably mounted the sector carrying member 21 having an annular flange 22 with which the chart carrying sector 12 is suitably connected, as by the rivets 23. The sector support 21 is recessed as indicated at 24 to clear the projections 25 of the disk 16 which extend through and prevent movement of the chart about the axis of the disk but permit it to be removed from the disk laterally when desired.

The pointer or indicator 26, which is adapted for use in determining the percent relative humidity in a manner hereafter described, is preferably constructed of transparent material, such as celluloid and suitably connected with an arm 27 on a sleeve 28 rotatably disposed between the hub 20 and an annular bearing or boss 29 of the sector support 21 as shown in Figure 3. The pointer or indicating hand is preferably provided with a series of suitable markings, such as the relatively small and closely positioned holes 30 in which may be inserted a pointed instrument to be used in a manner hereinafter set forth in connection with the humidity readings afforded by the present invention. The chart or diagram on the transparent sector 12 embodies a series of humidity pressure curves indicated by the lines 31 which extend from left to right or from the dry bulb to the wet bulb side of the sector, as indicated in Figure 1. These curves originate at points on line 31ª coinciding with the temperature indicating lines 13, it being understood that additional humidity pressure curves may be added between those shown, one for each of the lines 14, or for as many thereof as may be desired, such additional curves being omitted from the drawings for the sake of clearness. The sector is also provided with a per cent relative humidity scale adjacent its peripheral edge as indicated at 32 with graduations from zero to 100, the zero point, as well understood, representing a perfectly dry atmosphere while if the atmosphere is completely saturated the humidity is expressed as 100.

In using the present invention to determine the relative humidity from any portion of the chart traversed by the recording instruments of the wet and dry bulb thermometers it is necessary to first move the sector so that the line 33 of the wet bulb scale 34 intersects the wet bulb curve 17 at the point corresponding to the time for which the reading is to be taken. Then note the particular mark or hole on the indicator nearest to or coinciding with the wet bulb curve at said point. Then move the indicator counterclockwise until said mark intersects that one of the humidity pressure curves 31 corresponding nearest in degrees of temperature to that of the dry bulb thermometer curve 18 at its point of intersection with the line 33 of the sector. The relative humidity will then be indicated on scale 32 by the end of the pointer 26. Assuming by way of example that the wet bulb reading is 56° and the dry bulb reading 70° the relative humidity will then be indicated as approximately 50% as shown by the pointer in Figure 1. The relative humidity may thus be quickly determined for any hour of the day covered by the wet and dry bulb recording instruments.

If desired the point of an instrument such as a pencil may be inserted thru different holes 30 for the different readings taken from time to time by which the pointer may be conveniently moved and its correct indicating position readily determined by noting the point of intersection of the pencil point with the correct humidity pressure curve.

While I have shown one embodiment of the invention suitable for accomplishing the results desired, it will be understood that changes in the form, proportion and arrangements of parts may be made within the scope of the claims and without departing from the spirit of the invention as expressed therein.

I claim as my invention:

1. The combination with a record chart containing records made by wet and dry bulb recording thermometers, of means for determining from said records the relative humidity for the different temperatures indicated thereby, said means comprising a transparent chart having a dry bulb scale and a wet bulb scale in spaced relation and curves interconnecting the same, an index movably mounted on the transparent chart and a scale co-operating with the index.

2. The combination with a record chart containing records made by wet and dry bulb recording thermometers, of means for determining from said records the relative humidity for the different temperatures indicated thereby, said means comprising a transparent sector-shaped chart having a dry bulb scale along one of the radial edges, a wet bulb scale along the other of the radial edges, curves interconnecting the two scales, a humidity scale along the peripheral edge and an index arm mounted for pivoted movement and co-operating with the humidity scale.

3. A device according to claim 2, wherein the index arm is provided with a series of perforations extending lengthwise thereof.

RAYMOND E. OLSON.